(12) United States Patent
Gray

(10) Patent No.: US 7,734,713 B2
(45) Date of Patent: Jun. 8, 2010

(54) METHOD AND SYSTEM FOR ARBITRATING COMPUTER ACCESS TO A SHARED STORAGE MEDIUM USING SCSI PROTOCOL

(75) Inventor: Peter D. Gray, Toronto (CA)

(73) Assignee: Digital Multitools, Inc., Richmond Hill, Ontario (CA)

( * ) Notice: Subject to any disclaimer, the term of this patent is extended or adjusted under 35 U.S.C. 154(b) by 322 days.

(21) Appl. No.: 11/789,414

(22) Filed: Apr. 24, 2007

(65) Prior Publication Data

US 2008/0270565 A1 Oct. 30, 2008

(30) Foreign Application Priority Data

Mar. 7, 2007 (CA) .................................... 2581555

(51) Int. Cl.
*G06F 15/167* (2006.01)
(52) U.S. Cl. .................. 709/213; 709/216; 709/224; 711/150; 711/152; 711/163
(58) Field of Classification Search ................ 709/213, 709/216, 224; 711/150, 152, 163
See application file for complete search history.

(56) References Cited

U.S. PATENT DOCUMENTS

| | | | |
|---|---|---|---|
| 5,802,391 A | 9/1998 | Hwang | |
| 5,895,493 A | 4/1999 | Gatica | |
| 5,930,483 A * | 7/1999 | Cummings et al. | 710/107 |
| 6,115,797 A | 9/2000 | Kanda et al. | |
| 6,779,063 B2 | 8/2004 | Yamamoto | |
| 7,360,030 B1 * | 4/2008 | Georgiev | 711/141 |
| 2003/0204692 A1 * | 10/2003 | Tamer et al. | 711/163 |
| 2005/0246433 A1 | 11/2005 | Carrigan et al. | |
| 2007/0047908 A1 * | 3/2007 | Tanabe | 386/95 |
| 2007/0226447 A1 * | 9/2007 | Shimozono et al. | 711/170 |

* cited by examiner

*Primary Examiner*—Oanh Duong
(74) *Attorney, Agent, or Firm*—The Webb Law Firm

(57) ABSTRACT

A method of arbitrating access to a storage medium that is shared by M first computers operating on a Windows™ operating comprising (1) determining if the SCSI PR-flag has been set; (2) if yes, preventing the N second computers from writing to the storage medium; and (3) setting the SCSI MC-flag for each of said M first computers after one of the second computers writes to the storage medium to notify the M first computers that the contents of the storage medium may have changed.

13 Claims, 3 Drawing Sheets

METHOD AND SYSTEM FOR ARBITRATING COMPUTER ACCESS TO A SHARED STORAGE MEDIUM USING SCSI PROTOCOL

FIELD OF THE INVENTION

This invention relates to the field of computer storage media, and more particularly, the field of shared computer storage media.

BACKGROUND OF THE INVENTION

KVM devices are well known. An example KVM device is shown in published U.S. patent application number 2005/0246433 ("Carrigan et al."). KVM devices are used, inter alia, for maintenance applications, and specifically, for maintaining large banks of servers. KVM devices are configured so as to permit one or more local maintenance computer to receive the video of remote servers, and to transmit the keyboard and mouse inputs of a local maintenance computer to a remote server to permit control of the remote server. Preferably, the KVM device is also switchable between remote servers. As a result, a person doing maintenance can sit at a local computer and do maintenance on many remote servers without having to physically move from one remote server to the other.

Sometimes, it is desired to use the local computer to load software or data onto one or more of the remote servers. One method of accomplishing this task, as described in Carrigan et al., is to make use of a storage medium to which both the remote server and local computer have access. The problem then becomes finding a way to arbitrate read and write access to the shared storage medium between the local computer and the remote server, and it will be appreciated by those skilled in the art that the problem of effectively arbitrating access to a shared storage medium is a general problem not limited to the KVM context.

In Carrigan et al., the issue was resolved by creating a virtual disk drive. When the local computer wants to load the software or data, it mounts the virtual disk to itself, making the virtual disk drive available to it and inaccessible to the remote server. Once the software or data is copied to the virtual disk drive, the local computer unmounts the virtual disk drive, making it available to be mounted to the local computer or remote server. When it is desired to have the remote server acquire the software or data from the virtual disk drive, the user, controlling the remote server via the local computer and KVM, causes the remote server to mount the virtual disk drive to the remote server. The virtual disk drive is then inaccessible to the local computer. Once the acquisition is complete, the user causes the remote server to unmount the virtual disk drive.

It will be appreciated that this system for arbitrating storage medium access presents certain problems. First, it is cumbersome, in that it requires either the server or computer to take the step of mounting the virtual disk drive prior to reading and writing. Second, mounting the drive to either of the computers renders it completely inaccessible to the other. Thus, the arbitration between the two computers is very coarse, presenting the user with only two options, which options exclude any genuine shared access to the shared storage medium.

It will also be appreciated that both the local computers and servers are often Windows™ computers. The Windows™ operating system is not designed to deal with situations in which the storage contents can be changed as the Windows™ operating system is reading the storage contents. Thus, methods of arbitrating access to shared storage must account for this characteristic of the Windows™ operating system.

SUMMARY OF THE INVENTION

Therefore, what is desired is a system and method for effectively and efficiently arbitrating access to a shared storage medium. The system and method are preferably used in cases where at least some of the computers sharing the storage are Windows™-based computers, though the system and method are not limited to these circumstances. Also, the system and method are preferably used in cases where KVM maintenance computers and networked servers are sharing the storage, though the system and method are not limited to these circumstances.

According to an aspect of the present invention, there is provided a method of arbitrating access to a storage medium that is shared by M first computers operating on a Windows™ operating system, $M \geq 1$, and N second computers, $N \geq 1$, the method comprising the steps of:
  (1) determining if the SCSI PR-flag has been set;
  (2) if yes, preventing the N second computers from writing to the storage medium; and
  (3) setting the SCSI MC-flag for each of said M first computers after one of the second computers writes to the storage medium to notify the M first computers that the contents of the storage medium may have changed.

Preferably, the method further comprises the step of preventing access by the M first computers to the storage medium when one of the second computers is writing to the storage medium. Preferably, the method further comprises the step of delaying a write by one of the second computers for a timeout period when the PR-flag is set. Preferably, the method further comprises the step of causing said write to fail if the timeout period has passed and the PR-flag is still set. Optionally, $M=1$. Preferably, said N computers are networked on a network.

According to another aspect of the invention, there is provided a system for arbitrating access to a storage medium that is shared by M first computers operating on a Windows™ operating system, $M \geq 1$, and N second computers, $N \geq 1$, the system comprising:
  (1) a device for (a) determining if the SCSI PR-flag has been set, and if yes, preventing the N second computers from writing to the storage medium; and for (b) setting the SCSI MC-flag for each of said M first computers after one of the second computers writes to the storage medium to notify the M first computers that the contents of the storage medium may have changed;
  (2) a first link to operatively connect the device to the N second computers networked computer; and
  (3) a second link to operatively connect the M first computers to the device.

Optionally, $M=1$. Preferably, said N computers are networked on a network. Preferably, the device is further configured to prevent access by the M first computers to the storage medium when one of the N second computers is writing to the storage medium. Preferably, the device is further configured to delay a write to the storage medium by the N second computers for a timeout period when the PR-flag is set. Preferably, the device is further configured to cause said write to fail if the PR-flag is still set when the timeout period has passed. Preferably, said second link comprises a USB connection. Preferably, said second link comprises a link selected from: (1) parallel SCSI; (2) serial SCSI. Preferably, the first link comprises an ethernet connection. Preferably, the second link comprises at least one link selected from: (1) fibre channel link; (2) ATAPI interface; (3) Firewire (IEEE1394). Preferably, the first link comprises TCP/IP.

BRIEF DESCRIPTION OF THE DRAWINGS

Reference will now be made, by way of example only, to drawings of the invention, which illustrate the preferred embodiment of the invention, and in which.

DETAILED DESCRIPTION OF THE PREFERRED EMBODIMENTS

Figure 1:
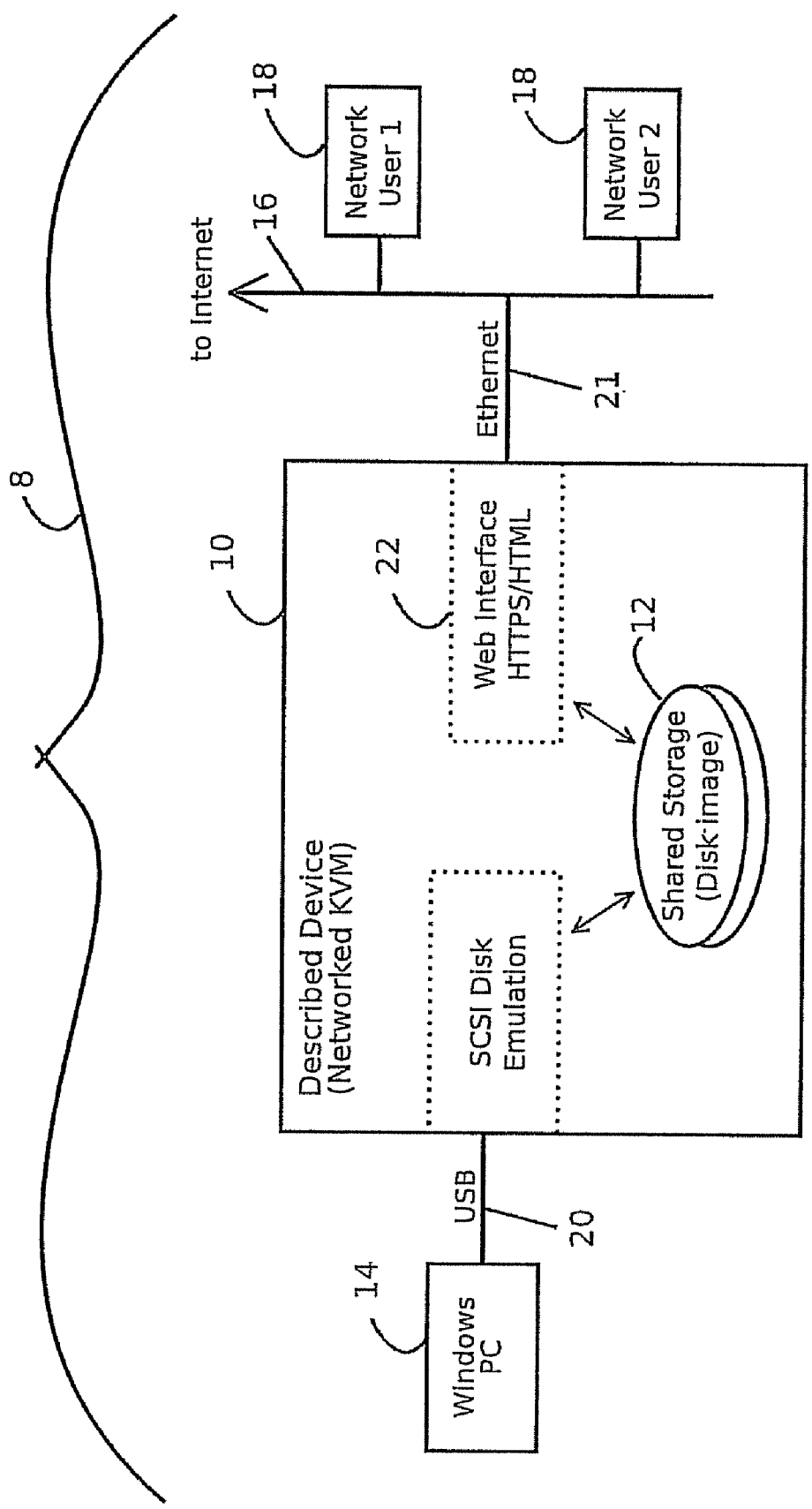
FIG. 1 is a schematic diagram of the preferred system and method of the present invention.

Referring now to FIG. 1, a preferred form of the system 8 for arbitrating access to a shared storage medium is shown. In this specification, the terms "access" and "accessing" refer to either or both of read access and write access, unless explicitly limited to only one of these. The system comprises a device 10 having associated therewith a storage medium 12 that is shared by a first computer 14 operating on a Windows™ operating system and by a computer network 16 having at least one network computer 18 thereon. For illustration, FIG. 1 shows two network computers 18, but it will be appreciated that the number of network computers 18 may be one or more.

The system 8 further comprises a first link 21 to operatively connect the network computers 18 to the device 10. Preferably, the first link 21 comprises an ethernet connection. However, the first link 21 need not be limited to the preferred form to be comprehended by the invention. Thus, the first link 21 may be any means of communicating information about the files on the medium 12. Preferably, the link 21 will be configured to present a high-level view of files, directories and other meta-data associated with the filesystem on the medium 12. Preferably, the link 21 can present information on a higher level that a block-by-block view of medium 12. Thus, for example, the first link 21 may comprise, for example, TCP/IP, or any other packet-switched network link.

Preferably, the second link 20 comprises a USB connection, and most preferably, USB Mass Storage Class. It will be appreciated, however, that the invention comprehends other forms of second link 20. The link 20 may take any form that implements the SCSI protocol (direct-access class) which includes the setting and clearing of SCSI MC and PR flags to be communicated to the first computer.

Preferably, the device 10 comprises KVM functionality. This functionality preferably includes causing the keyboard and mouse outputs of computer 14 to be delivered to computer 18 so that the computer 18 is remotely controlled by the user of computer 14. This functionality also preferably includes receiving the video output of the controlled computer 18 and transmitting it to the computer 14 to permit the user of computer 14 to view the video of the controlled computer 18.

It will be appreciated, however, that the present invention is not limited to a device having KVM functionality. Rather, the device may be any device that arbitrates access to a shared storage medium. Furthermore, while the preferred embodiment is being described with reference to a single computer 14, the invention comprehends a system in which there are M computers 14 and N computers 18, where M and N are each whole numbers greater than or equal to one. Thus, the storage 12 is shared among M computers 14 via link 20, and N computers 18 via link 21.

In the preferred embodiment, the computers 14 operate using a Windows™ operating system, and computers 18 are networked. However, it will be appreciated that the invention comprehends other, non-preferred configurations. What is important is that the system 8 arbitrates access to storage 12 that is shared by M computers 14 on the one hand and N computers 18 on the other.

Preferably, the storage of the actual data shared by the computers 14 and computers 18 is located in the device 10. Given the preferred KVM functionality of device 10, the shared storage is preferably 16 megabytes of RAM. It will be appreciated, however, that the storage medium may take any computer readable form, including, for example, Flash memory, or magnetic storage media such as tapes and disk drives. It will further be appreciated that the storage 12 may, less preferably, be associated with but separate from the device 10.

It will further be appreciated that both the system 8, and the device 10 thereof, may be composed of one or more physical pieces, and the elements and functionality of both the system 8 and device 10 may be implemented in either software, hardware, or firmware, any combination of these, or none of these, and are still comprehended by the invention.

Preferably, the device 10 is configured to communicate with the computers 18 through an HTML interface 22, such that the files on the storage medium 12 are presented to the computer 18 as web pages giving a table of files and directories. Since computers 18 are typically remote from device 10, and thus preferably networked via the Internet or another network, the HTML interface 22 is preferred. In this configuration, the user of a network computer 18 may download the files from and upload files to the storage medium 12 using, for example, a browser such as Microsoft™ Internet Explorer™, or Firefox™. This configuration is preferred because since HTML interface 22 and ethernet link 21 are preferably used, the network users can be located anywhere in the world and access the storage 12 via the internet.

Preferably, the device 10, second link 20 and computer 14 are configured so as to present the files in the storage 12 to a user of the computer 14 inside the disk drive letter (an emulated USB drive). In this preferred configuration, the user of a Windows™ computer 14 may use Windows™ Explorer™ or any other Windows™ program to move files to or from the storage 12 or even to work directly on the files while they are stored in the storage 12. Thus, the files on storage 12 may be accessed normally, like those on any other drive of a Windows™ system, by the user of the Windows™ computer 14.

Figure 2:
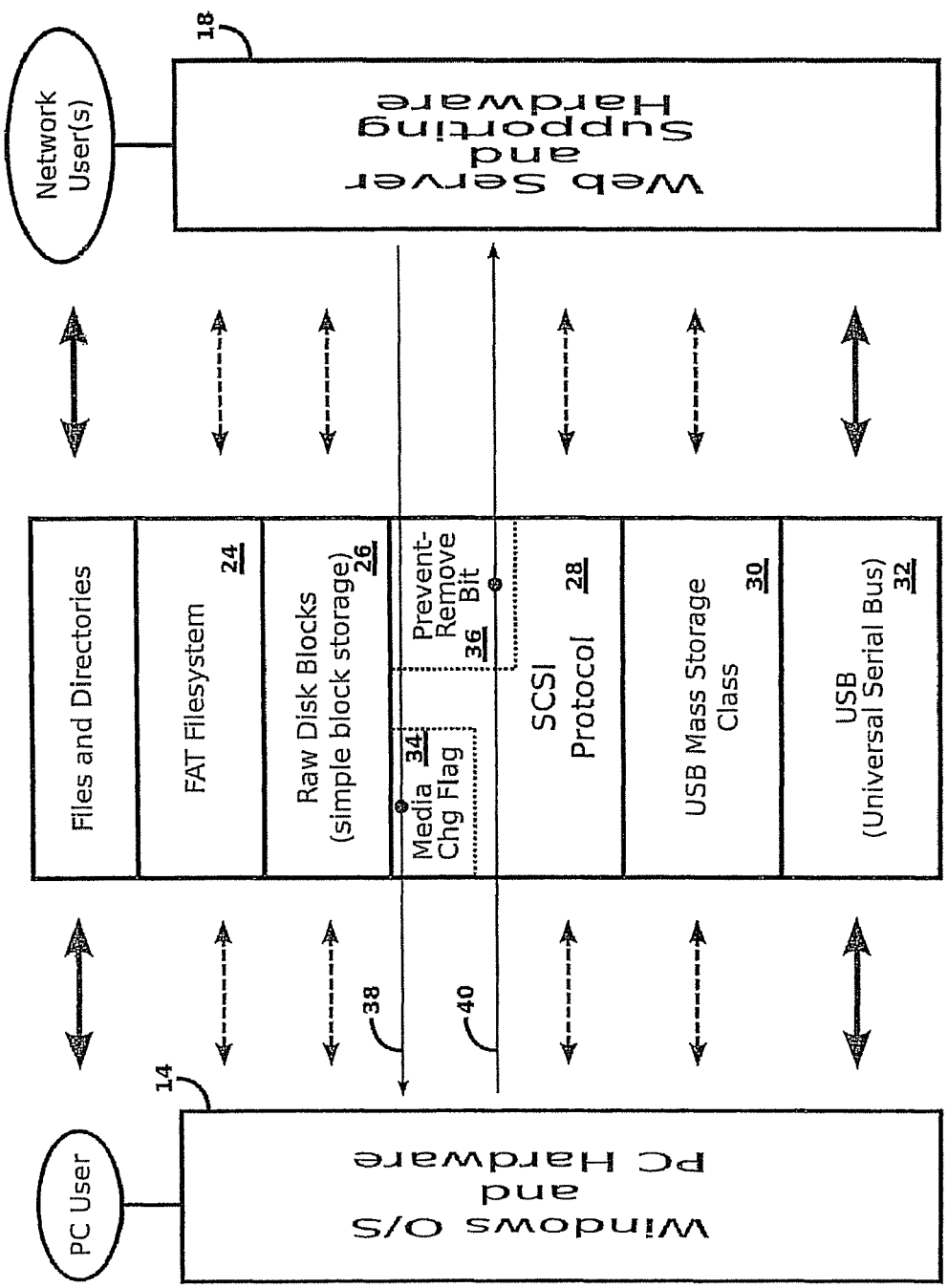
FIG. 2 is a protocol stack diagram of the preferred system and method, showing the logical layers of the preferred form of the invention.

FIG. 2 depicts the system 8 of the present invention as a protocol stack. Towards the bottom of FIG. 2, the physical and electrical connections of the system 8 are shown. Toward the top, the logical/conceptual interfaces between the computers 14 and computers 18 are shown. The system permits a user of computer 14 (preferably a Windows™ computer) to share files and directories with users of computers 18 (preferably network computers connected on network 16). In the preferred embodiment, the files and directories are realized by the FAT filesystem 24, which file system imposes a hierarchical organization (i.e. directories), and tracks which files are inside which disk blocks within the storage 12. In the preferred embodiment, a disk block comprises 512 bytes of data, organized in a linear array by block numbers. That abstraction is shown as layer 26 in FIG. 2.

The SCSI command protocol (reference numeral 28) provides the means to address disk blocks and read them or write them. The SCSI protocol 28 is a communications protocol that defines the interactions between modern disk drives and computers. It provides commands to read and write disk blocks, which blocks are typically 512 bytes in size.

It will be appreciated by those skilled in the art that the SCSI protocol (Small Computer Systems Interface) is a communications protocol that defines the interactions between modern disk drives and computers. This protocol provides commands to read and write blocks. Two of the flags/bits used by the SCSI protocol to communicate information are the media-changed bit (MC-bit) and the prevent-remove bit (PR-bit), which bits will be discussed in greater detail below. Windows™ computers are programmed to communicate with their own disk drives using the SCSI protocol. For example, in an ordinary Windows™ computer having a CDROM drive, a user may wish to remove the CDROM from the drive while the computer is accessing the CDROM. However, in such a case, the computer will set the PR-bit, which prevents removal of the CDROM while it is being accessed. The practical result is that the "eject" button on the CDROM drive is disabled while the CDROM is being accessed, and once that access is complete, the Windows™ computer clears the PR-bit. Furthermore, in a case where the first CDROM is removed and a second CDROM inserted, the CDROM drive will set the MC-bit to tell the Windows™ computer that the storage medium has changed. The Windows™ computer will read this bit and clear it.

Therefore, it will be appreciated that the SCSI protocol is particularly well-suited for arbitrating access to a shared storage 12 when the storage 12 is shared by a Windows™ computer. It will also be appreciated, however, that the invention comprehends arbitrating access to a shared storage 12 even when the shared storage 12 is not accessible by a Windows™ computer. For example, the storage 12 could be accessible by some other operating system that implements the SCSI protocol, such as, for example, Linux™, FreeBSD™ or some type of Unix™ system.

The SCSI protocol 28 is preferably implemented using USB Mass Storage Class (reference numeral 30). The USB Mass Storage Class 30 is preferably implemented using a USB link 32 to connect computers 14 and 18. It will be appreciated that each of the layers above and below the SCSI protocol 28 in FIG. 2 could be implemented by means other than the preferred means described herein, and still be comprehended by the invention. For example, a direct attachment SCSI interface (serial link or parallel bus) could be used in place of the USB Mass Storage Class 30. In such a case, layers 30 and 32 would be subsumed into a single layer described by the various existing SCSI electrical interface specifications. As another example, the shared storage 12 could be implemented in ways other than the preferred FAT file system 24. Any method that permits access to information on the storage 12 is comprehended by the invention. For example, the NTFS file system could be used.

As shown in FIG. 2, the MC-bit 34 and the PR-bit 36 are part of the SCSI protocol 28. The bits 34 and 36 are shown by arrows 38, 40 as being directly communicated between the computer 14 and computer 18. In the preferred embodiment of the invention, the bits 34, 36 are the main arbitrators of the access to the storage 12, and are thus available to be read, set, and cleared by the device 10, computer 14 and computer 18 as more particularly described below.

Figure 3:
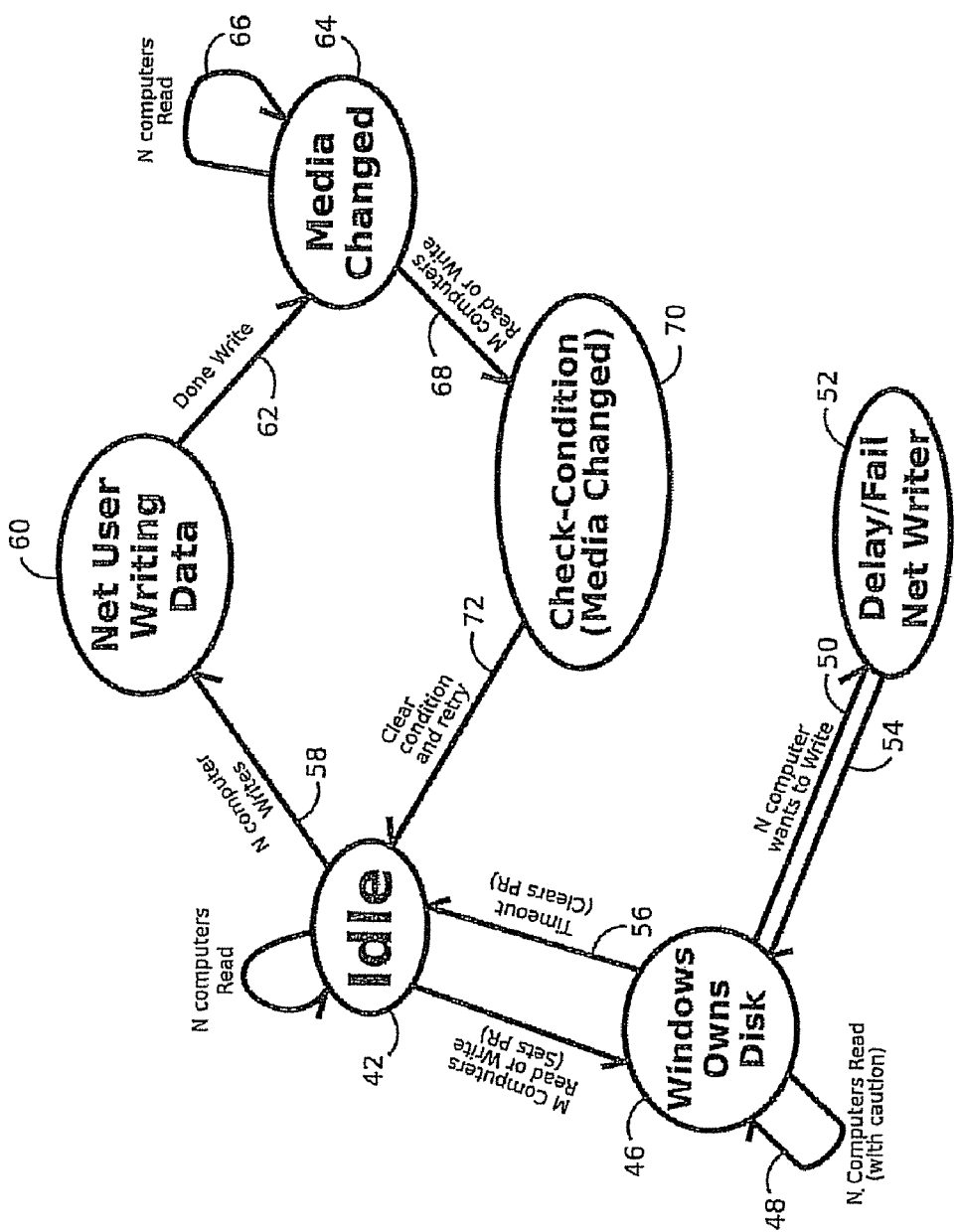
FIG. 3 is a state transitions diagram showing the various states of the preferred system and the transitions between these states.

FIG. 3 illustrates the logical states in which the system 8 can find itself. The system, preferably comprising computers 14 and 18 and device 10, starts in idle state 42. In idle state 42, none of the computers 14, 18 is attempting to write to storage 12. The MC-bit 34 and PR-bit 36 are both clear. Thus, any of the computers 18 may read the storage 12, and the state 42 is not affected.

When the computer 14 (preferably a Windows™ computer) is to access (i.e. write to or read from) storage 12, the computer 14 sets the PR-bit 36. The PR-bit 36, in ordinary computers having disk drives, prevents the removal of the storage medium. In ordinary CD-ROM drives, this involves the disabling of the "eject" button. The PR-bit 36 is thus used to prevent the storage to be accessed from being removed. In the present invention, the setting of the PR-bit puts the system into state 46, in which the Windows™ computer 14 has the right to change the shared storage freely.

In the preferred embodiment, in state 46, the computer(s) 18 may read storage 12. This reading operation is indicated by reference character 48. Such a read does not take the system out of state 46. However, the operation 48 proceeds with caution, because the disk structure (i.e. the state of data and files on storage 12) may not be in a self-consistent state. For example, a directory on storage 12 may be deleted while it is being viewed by the computer 18 performing operation 48. However, the changing of the files and directories on storage 12 by the computer 14 while storage 12 is being read by computer 18 can be handled using techniques known to those skilled in the art.

By contrast, writes by computer 18 to storage 12 are delayed when the PR-bit 36 is set, and the system is in state 48. Most preferably, the device 10 is configured to delay the write by the computer 18 for a predetermined time-out period. This delay is shown as operation 50 and state 52. If the time-out period is exceeded, and the PR-bit is still set, then the device 10 is configured to perform operation 54, namely, the reporting of a failure of the write by the computer 18 to the storage 12. Once the computer 14 stops attempting to access the storage 12 (i.e. stops attempting to write to and/or read from storage 12), the PR-bit 36 is cleared by the computer 14 after the computer 14 has stopped using the storage 12 for a predetermined delay period (usually 1-2 seconds). The clearing of the PR-bit after the delay period is exceeded is shown as operation 56, and the system is then returned to idle state 42.

In idle state 42, computer 18 may start writing to storage 12 at any time. A write operation 58 by computer 18 places the system in state 60. In state 60, the device 10 prevents computer 14 from accessing the drive (i.e. no read access and no write access). In operation 62, which comprises the completion of the write operation 58, device 10 sets the MC-bit 34 for each of the M first computers 14, placing the system in state 64. In state 64, computer(s) 18 may continue to access the storage 12, (i.e. read access or write access). Such access is shown as operation 66, and state 64 is maintained.

An initial access attempt (i.e. read access or write access) by a computer 14 is shown in FIG. 3 as operation 68. By virtue of the SCSI protocol, operation 68 fails with an SCSI check-condition, placing the system in state 70. In state 70, preferably, Windows™ will read the reason for the failure, namely, that the media may have changed, and then the computer 14 clear the MC-bit and make a next access attempt (operation 72), which next access attempt succeeds if there are not any other reasons for failure. Operation 72 places the system back in idle state 42, though the read or write by computer 14 after operation 72 will then place the system immediately into state 46.

It will be appreciated that, in systems with multiple computers 14, each computer 14 that has had its MC-bit set will fail in its initial access attempt with an SCSI check condition, will then clear its MC-bit, and will make a next access attempt.

Thus, it will be appreciated that the system and method of the present invention uses the SCSI protocol to arbitrate between a set of M computers and a set of N computers that share storage 12. In the preferred embodiment, the Windows™-based M computers see the storage 12 as another disk drive letter, and communicate with it, using the SCSI protocol, just as they would with their own disk drives. It will be appreciated by those skilled in the art that the SCSI protocol was never intended to arbitrate storage access between two sets of computers. Rather, the present invention makes inventive use of the features of the SCSI protocol to arbitrate storage access between two sets of computers.

While the foregoing embodiments of the present invention have been set forth in considerable detail for the purpose of making a complete disclosure of the invention, it will be apparent to those skilled in the art that various modifications can be made to the system and method without departing from the broad scope of the invention as defined in the attached claims. Some of these variations are discussed above and others will be apparent to those skilled in the art. For example, the system can be used to arbitrate access to storage shared by between computers that do and do not use a Windows™ operating system, or can arbitrate access between two or more sets of computers that do not use Windows™. Also, the system and method can arbitrate between two computers, two sets of one or more computers, or more than two sets of one or more computers.

The embodiments of the invention in which an exclusive property or privilege is claimed are defined as follows:

1. A method of arbitrating access to a storage medium that is shared by M first computers operating on a WINDOWS operating system, M≧1, and N second computers, N≧1, the method comprising the steps of:
    determining, by a device, if SCSI (Small Computer Systems Interface) PR-flag (Prevent-remove flag) has been set;
    if the SCSI PR-flag has been set, preventing the N second computers from writing to the storage medium;
    setting, by a storage medium drive, a SCSI MC-flag (media-change flag) for each of said M first computers after one of the second computers writes to the storage medium using SCSI protocol;
    notifying the M first computers that contents of the storage medium have changed based on the SCSI MC-flag used by the SCSI protocol;
    delaying a write to the storage medium by the one of the N second computers for a timeout period when the PR-flag is set; and
    causing said write to fail if the timeout period has passed and the PR-flag is still set.

2. The method as claimed in claim 1, further comprising the step of preventing access by the M first computers to the storage medium when the one of the second computers is writing to the storage medium.

3. The method of claim 1, wherein M=1.

4. The method of claim 1, wherein said N computers are networked on a network.

5. A system for arbitrating access to a storage medium that is shared by M first computers operating on a WINDOWS operating system, M≧1, and N second computers, N≧1, the system comprising:
    a device for (a) determining if the SCSI (Small Computer Systems Interface) PR-flag (Prevent-remove flag) has been set, and if the SCSI PR-flag has been set, preventing the N second computers from writing to the storage medium; for (b) setting a SCSI MC-flag (media-change flag) for each of said M first computers after one of the second computers writes to the storage medium using SCSI protocol, and for (c) notifying the M first computers that contents of the storage medium have changed based on the SCSI MC-flag used by the SCSI protocol;
    a first link to operatively connect the device to the N second computers;
    the device further being configured to delay a write to the storage medium by the N second computers for a timeout period when the PR-flag is set and to cause said write to fail if the PR-flag is still set when the timeout period has passed; and
    a second link to operatively connect the M first computers to the device.

6. The system of claim 5, wherein M=1.

7. The system of claim 5, wherein said N computers are networked on a network.

8. The system of claim 5, the device further being configured to prevent access by the M first computers to the storage medium when the one of the N second computers is writing to the storage medium.

9. The system of claim 5, wherein said second link comprises a USB connection.

10. The system of claim 5, wherein said second link comprises a link selected from: (1) parallel SCSI; (2) serial SCSI.

11. The system of claim 5, wherein the first link comprises an ethernet connection.

12. The system of claim 5, wherein the second link comprises at least one link selected from: (1) fibre channel link; (2) ATAPI interface; (3) Firewire (IEEE1394).

13. The system of claim 5, wherein the first link comprises TCP/IP.

* * * * *